US012268643B2

(12) United States Patent
Smith

(10) Patent No.: US 12,268,643 B2
(45) Date of Patent: Apr. 8, 2025

(54) PORTABLE LIFT CHAIR DEVICE

(71) Applicant: Platinum Health, LLC, Orlando, FL (US)

(72) Inventor: Randall L. Smith, Orlando, FL (US)

(73) Assignee: Platinum Health, LLC, Orlando, FL (US)

( * ) Notice: Subject to any disclaimer, the term of this patent is extended or adjusted under 35 U.S.C. 154(b) by 413 days.

(21) Appl. No.: 18/056,075

(22) Filed: Nov. 16, 2022

(65) Prior Publication Data

US 2024/0156659 A1 May 16, 2024

(51) Int. Cl.

| | |
|---|---|
| ***A61G 7/10*** | (2006.01) |
| ***A47K 3/12*** | (2006.01) |
| ***A47K 13/10*** | (2006.01) |
| ***A61G 5/10*** | (2006.01) |
| ***A61G 5/14*** | (2006.01) |
| ***A61G 7/02*** | (2006.01) |

(52) U.S. Cl.

CPC ............ *A61G 7/1019* (2013.01); *A47K 3/122* (2013.01); *A47K 13/10* (2013.01); *A61G 7/02* (2013.01); *A61G 7/1059* (2013.01); *A61G 7/1088* (2013.01); *A61G 7/1092* (2013.01); *A61G 5/1002* (2013.01); *A61G 5/14* (2013.01)

(58) Field of Classification Search

CPC ...... A61G 7/1019; A61G 7/02; A61G 7/1059; A61G 7/1088; A61G 7/1092; A47K 3/122

See application file for complete search history.

(56) References Cited

U.S. PATENT DOCUMENTS

| | | | | |
|---|---|---|---|---|
| 4,456,086 | A * | 6/1984 | Wier | A61G 5/14 297/DIG. 10 |
| 5,375,913 | A * | 12/1994 | Blanchard | A61G 5/1054 297/DIG. 10 |
| 6,945,604 | B2 * | 9/2005 | Splane, Jr. | A61G 7/1007 297/DIG. 10 |
| 7,815,209 | B2 * | 10/2010 | Porcheron | A61G 5/1089 280/250.1 |
| 10,888,476 | B2 * | 1/2021 | Fakhrizadeh | A61G 5/1056 |

* cited by examiner

*Primary Examiner* — Anthony D Barfield

(74) *Attorney, Agent, or Firm* — McHale and Slavin, P.A.

(57) ABSTRACT

An adjustable lift chair having a frame supporting a seat that can be moved from a horizontal position to an upright angular position. The lift chair providing those with physical limitations the ability to move from a seated position to a standing position. The lift chair having a particular use in a bathroom wherein the chair can be used in a shower, bath, or for use as a toilet overlay. A piston device coupled to a battery provides portability, the piston device is operated by a remote controller.

9 Claims, 6 Drawing Sheets

PORTABLE LIFT CHAIR DEVICE

FIELD OF THE INVENTION

The present invention relates to personal assistance devices used in health care and, in particular, to an adjustable lift chair for use in the bath, shower, toilet or the like applications.

BACKGROUND OF THE INVENTION

Individuals with disabilities are at a disadvantage when required to use various appliances that were designed for individuals having no physical limitations. For instance, bathrooms in North America are designed for mobile individuals capable of standing up in a shower, sitting down in a bathtub, or utilizing sanitary hardware such as a toilet. Bathrooms are simple to navigate if physically able, but can be tremendously difficult to navigate with even minor physical limitations. The difficulty is not limited to the elderly, an individual suffering back pains can find a conventional bathroom most difficult to navigate. Attempting to stand up from a sitting position can be embarrassing difficult.

There is growing population in need of assistance in the bathroom. Such individuals may require modifications be made to the bathroom or use of devices that make a conventional bathroom accessible. Walkers, wheel chairs and the like provide assistance but do not directly address the problem.

Individuals needing assistance with bath, shower, and toilet usage may have difficulty getting up from a seated position to a standing position. This is especially noticeable with elderly individuals suffering from age related muscular deterioration, or age related degenerative changes in bone health. Such individuals may have great difficulty in moving from a sitting position, such as when using the toilet, to a standing position. Again, the problem is not age related, countless young people suffer needlessly in their attempt to go from a sitting position to a standing position, or from a standing position to a seated position. To be self sufficient, such individuals may need a toilet modification to avoid requesting others to assist in the task.

Similarly an individual taking a bath or shower may require modifications to the bath and/or shower to raise them from a sitting position. Their ability to stand from a seated position can be limited and most dangerous if they fall. Individuals having leg, hip or back injuries, nerve damage or muscular deterioration may all have difficulty in standing from a seated position.

Modifications to the bathroom can be made such as railings in the shower, handles next to the toilet, or movable seats that attach to the bathtub sidewall. All of which is an unwelcome expense and, if the devices require permanent modification to the bathroom, may detract from the bathroom decor and may actually interfere with the use of the bathroom by individuals that have no disability. Further, permanent modifications to a bathroom may detract from the property resale value if the next owner deems the modifications unnecessary for their use.

Modifications of a bathroom are especially problematic in a retirement or assisted living home. Such modifications are not required by every individual living in the home and can result in unwanted obstacles. Guests visiting may not be familiar with how the devices work and the individual living in the home can be embarrassed if their relatives believe their health requires use of such devices. It is not practical for a retirement home to remodel a bathroom every time a new individual takes over a living space.

Numerous assistance devices are known in the art, including lift kits, walkers, wheelchairs and the like. All known such devices are unwieldy and not amenable to use in a conventional bathroom.

What is needed in the field is a portable, height adjustable lift chair device which can be placed in the bathroom for use as a bath chair, shower chair, or toilet chair with the provision of assisting in lifting an individual from a seated position to a raised position.

SUMMARY OF THE INVENTION

Disclosed is a chair having a height-adjustable lower leg frame with attached seat section and back section. The back section having an actuator device for vertically raising the rear of a seat section and arm member in a direction to cause a lifting of the individual from a sitting position to a standing position. A hand-held control device operates the piston based actuator.

An objective of the invention is to provide a convenient modality apparatus for lifting physically impaired individuals from a seated position to a raised position.

Another objective of the invention is to provide an apparatus assist elderly, medical patients, or physically disabled individuals, to use a shower or bath, or use a toilet, by providing a lightweight portable lifting device that allows for ease of relocation.

Yet still another objective of the invention is to provide a portable lifting device that can be easily adjusted to accommodate various heights and seating arrangements. In particular, the lifting device height can be adjusted to accommodate any toilet basin height.

Another objective of the invention is to provide a lifting device that sits in a flat position for use using a pivoting seat to promote lifting of an individual from a seated to a standing position through use of a control device.

A benefit to the individual using the instant lifting chair is a side arm controller attached to a moveable arm member wherein the individual is able to control the rate of lift and maintain a grip to the side arm.

Yet another benefit of the instant invention is the portability wherein the lifting chair can be moved between a shower, tub and toilet basin without modification.

Still another benefit of the instant invention is use of waterproof components allowing use in a wet environment, namely to allow an individual to sit while taking a shower.

Other objectives and advantages of this invention will become apparent from the following description, taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DESCRIPTION OF THE PREFERRED EMBODIMENT OF THE INVENTION

Figure 1:
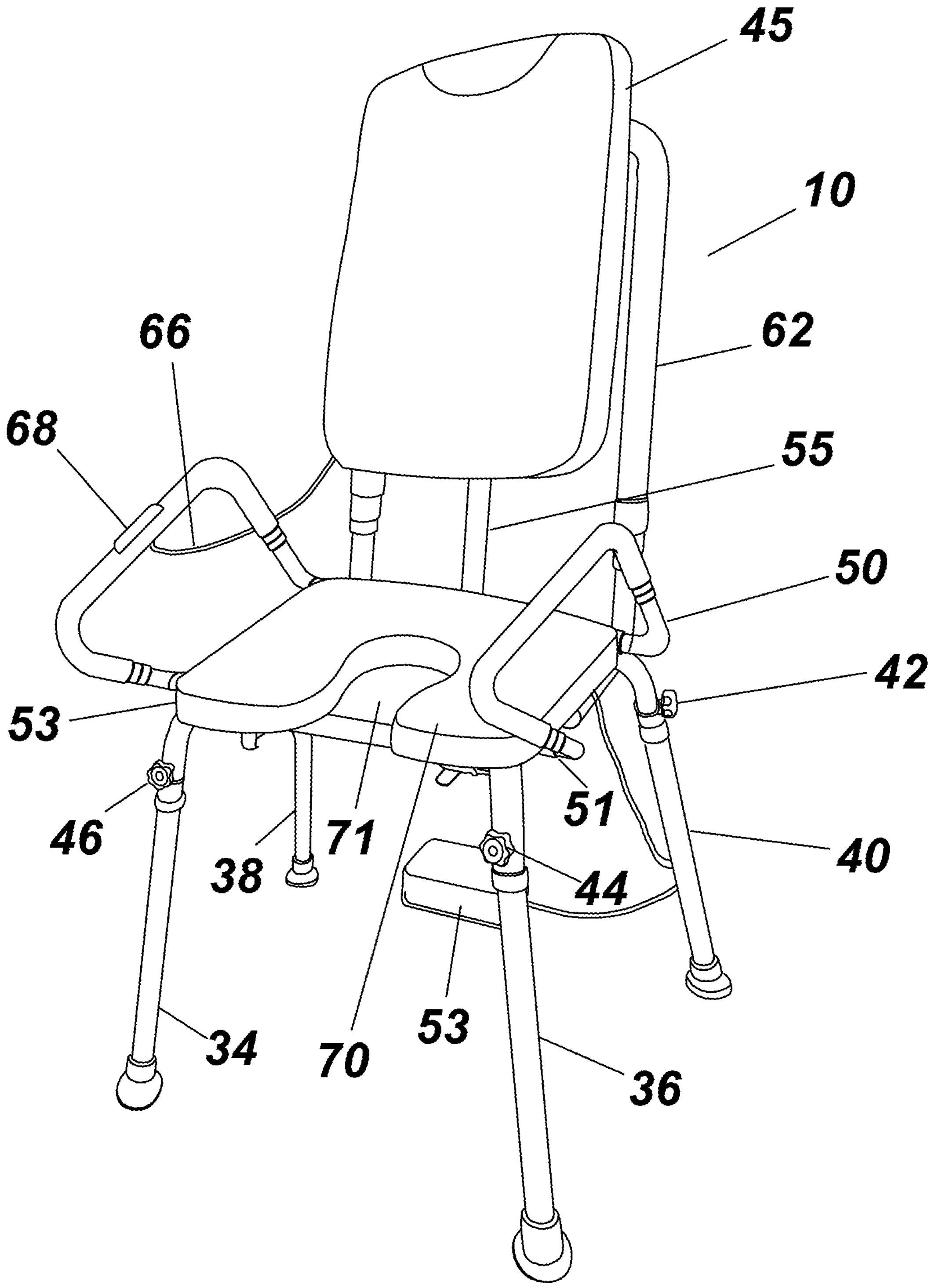
FIG. 1 is a front perspective view of the adjustable lift chair assembly with the seat in a lowered position.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the Figures in general, disclosed is a portable, adjustable lift chair 10. The chair 10 has a lower frame section 12, consisting of front and rear cross members 14 and 16, each cross member having a left and right upper leg extension tube 18, 20, 22 and 24. Each of the four upper leg extension tubes 18, 20, 22 and 24 has a spring loaded internal pin 26, 28, 30 and 32 located at the distal end of each extension tube. Four lower leg extension tubes 34, 36, 38 and 40, are vertically inserted over the slightly smaller diameter upper leg extension tubes 18, 20, 22 and 24, and adjusted at the appropriate height using a plurality of equidistant holes by insertion of the internal pins 26, 38, 30 and 32, which protrude axially from the upper leg extension tubes 18, 20, 22 and 24. After insertion of the leg sections, the four legs are now height adjustable using the four equidistant holes located on the lower leg extension tubes 34, 36, 38 and 40, and the internal pins 26, 28, 30 and 32 located on the upper leg extension tubes 18, 20, 22 and 24.

Each of the four lower leg extension tubes 34, 36, 38 and 40 are fitted with an internal fastener having plastic knobs 42, 44, 46, 48, for tightening the fastener inserted at the upper end of the lower leg extension tubes 34, 36, 38 and 40. The fasteners can be tightened for extra stability once the appropriate height adjustment has been obtained and securing the lower extension tubes to the upper extension tubes.

The chair frame 12 is fitted with an arm member 50, having a first distal end 51 pivotally attached to the forward left side of an upper extension tube, and a second distal end 53 pivotally attached to the forward right side of an upper extension tube providing a spaced apart position for use as arm rests. The arm member having a bracket 52 adjoining the first and second distal ends adjoined around the rear of the bottom 55 of an upper frame member 62 attached to the lower frame member 12. The upper frame member 62 including a vertical disposed back assembly 45.

Figure 2:
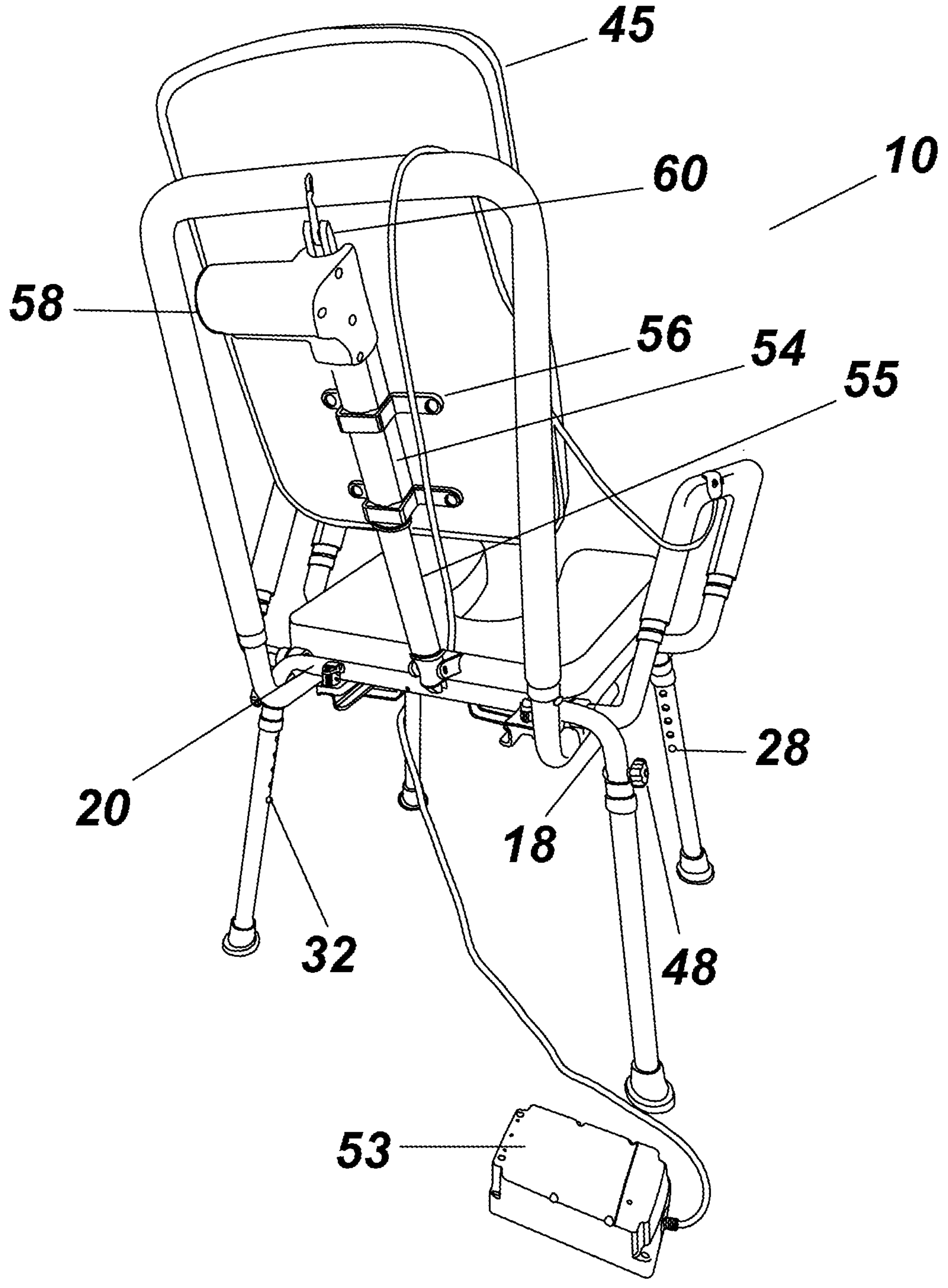
FIG. 2 is a rear perspective view thereof.
Figure 3:
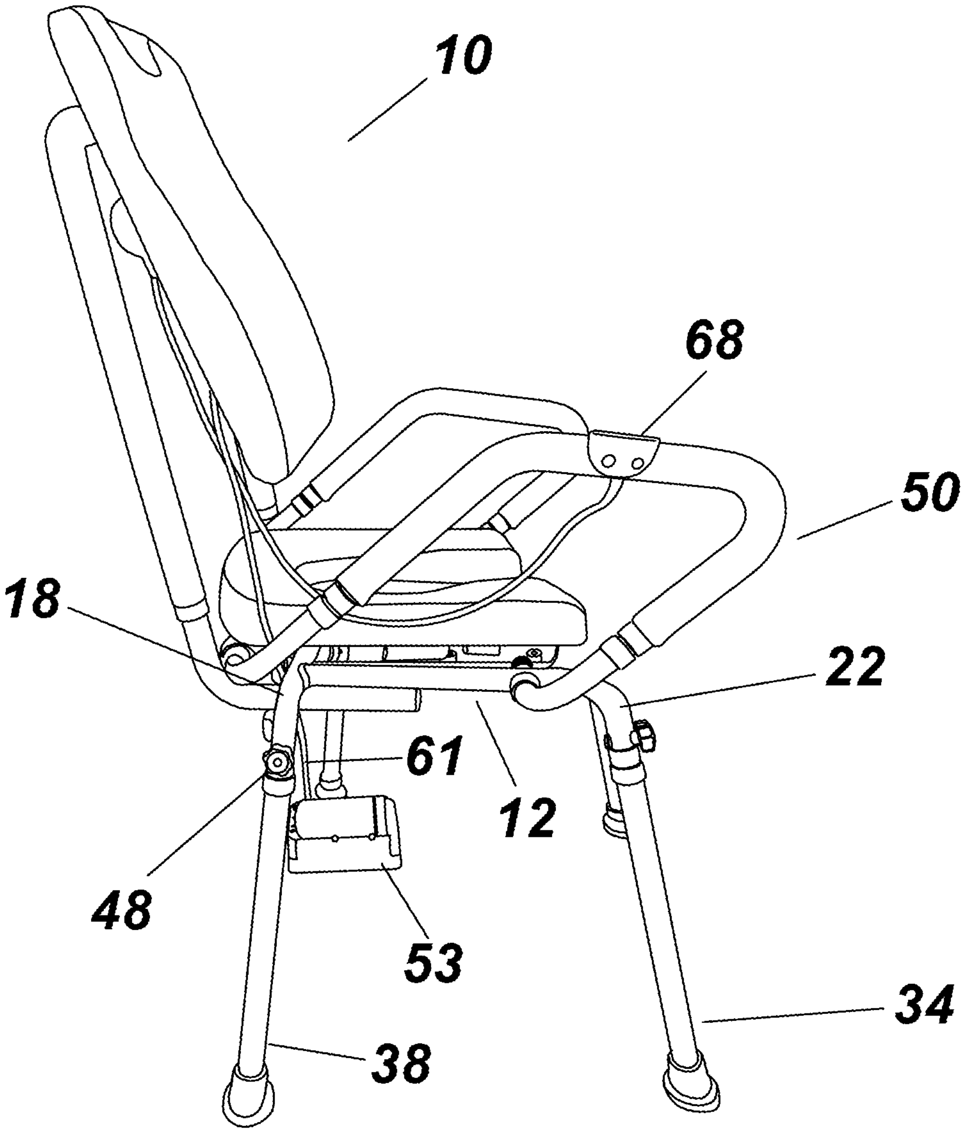
FIG. 3 is a side perspective view thereof.
Figure 4:
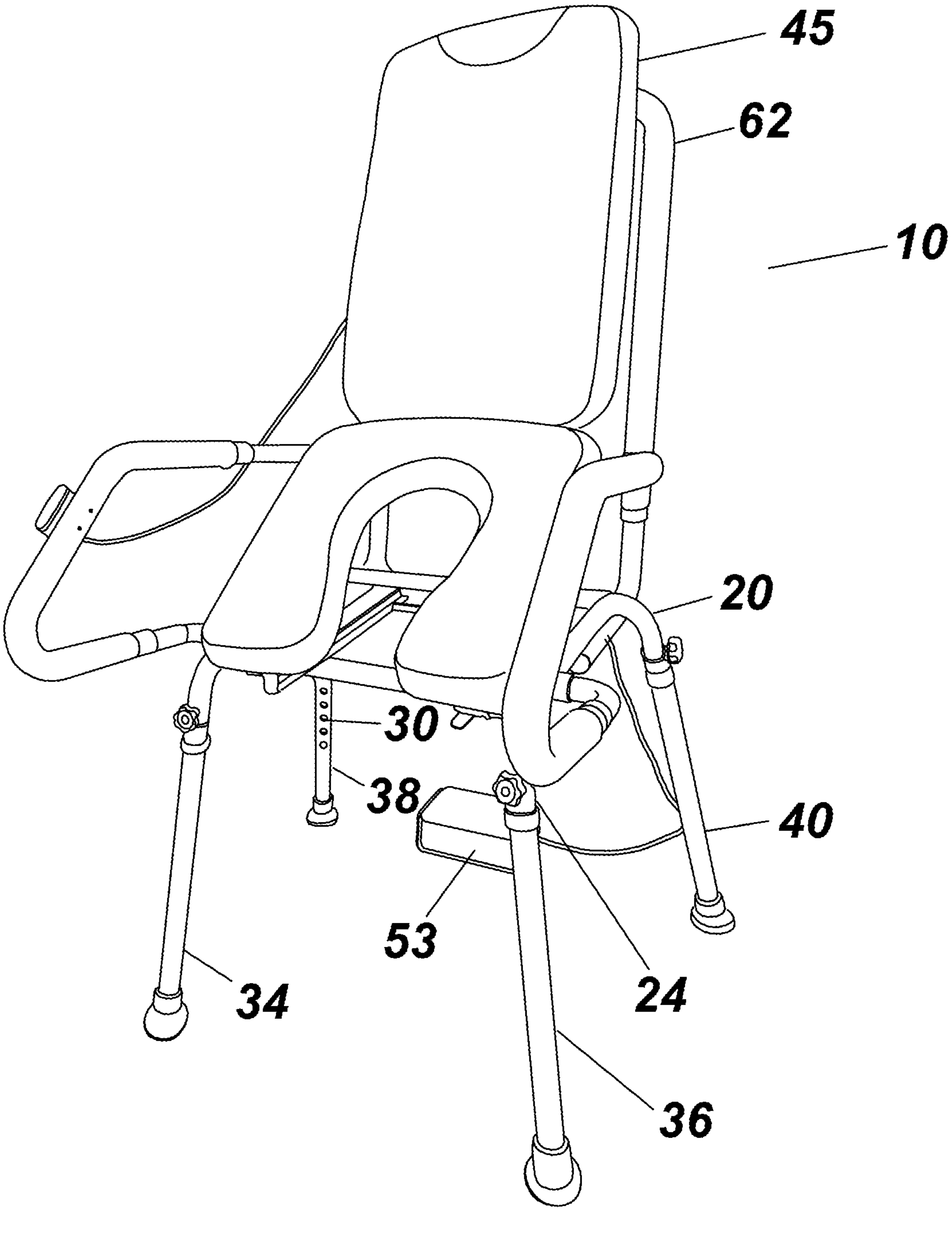
FIG. 4 is a front perspective view of the seat in a raised position.
Figure 5:
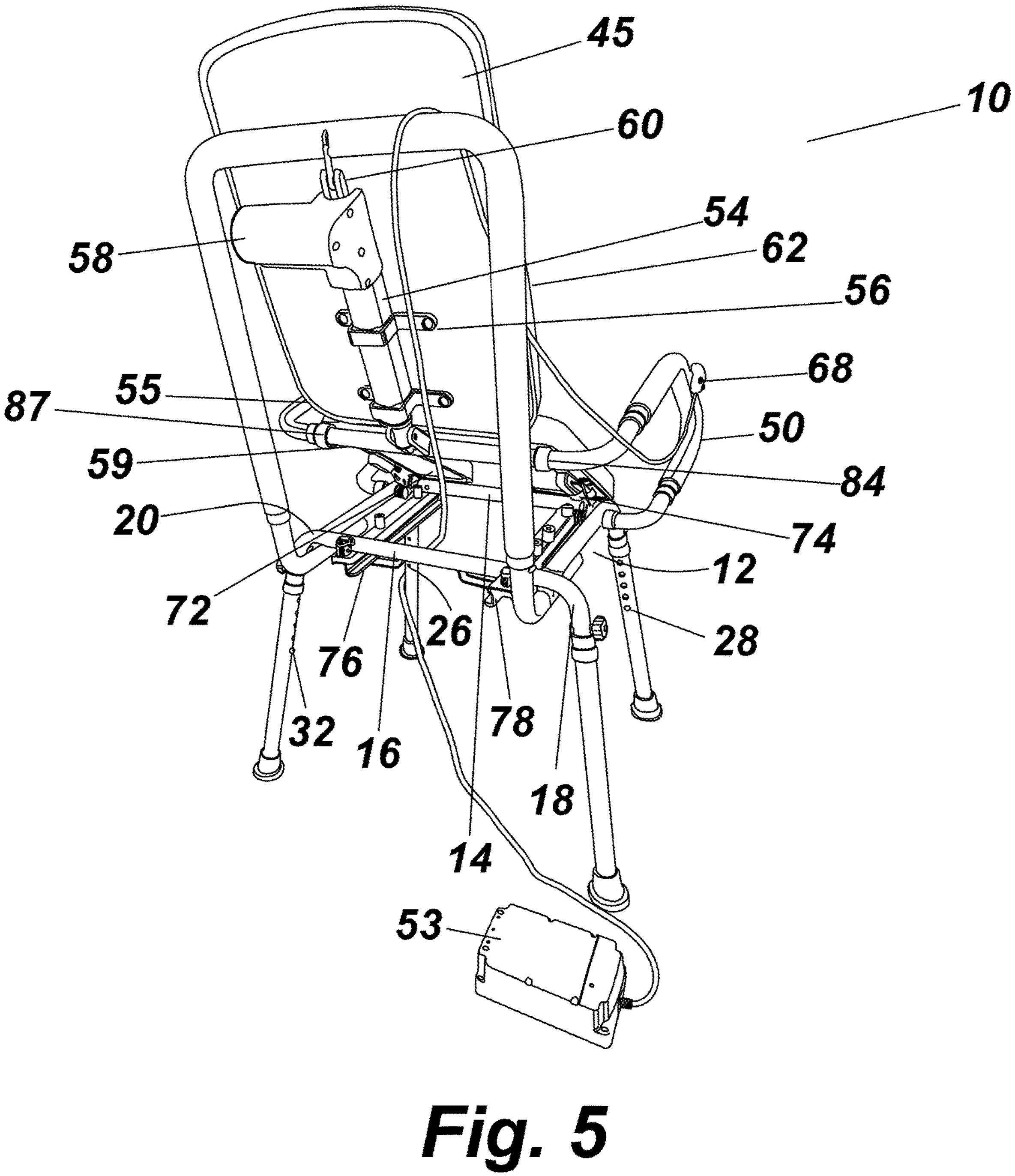
FIG. 5 is a rear perspective view with the seat in a raised position.
Figure 6:
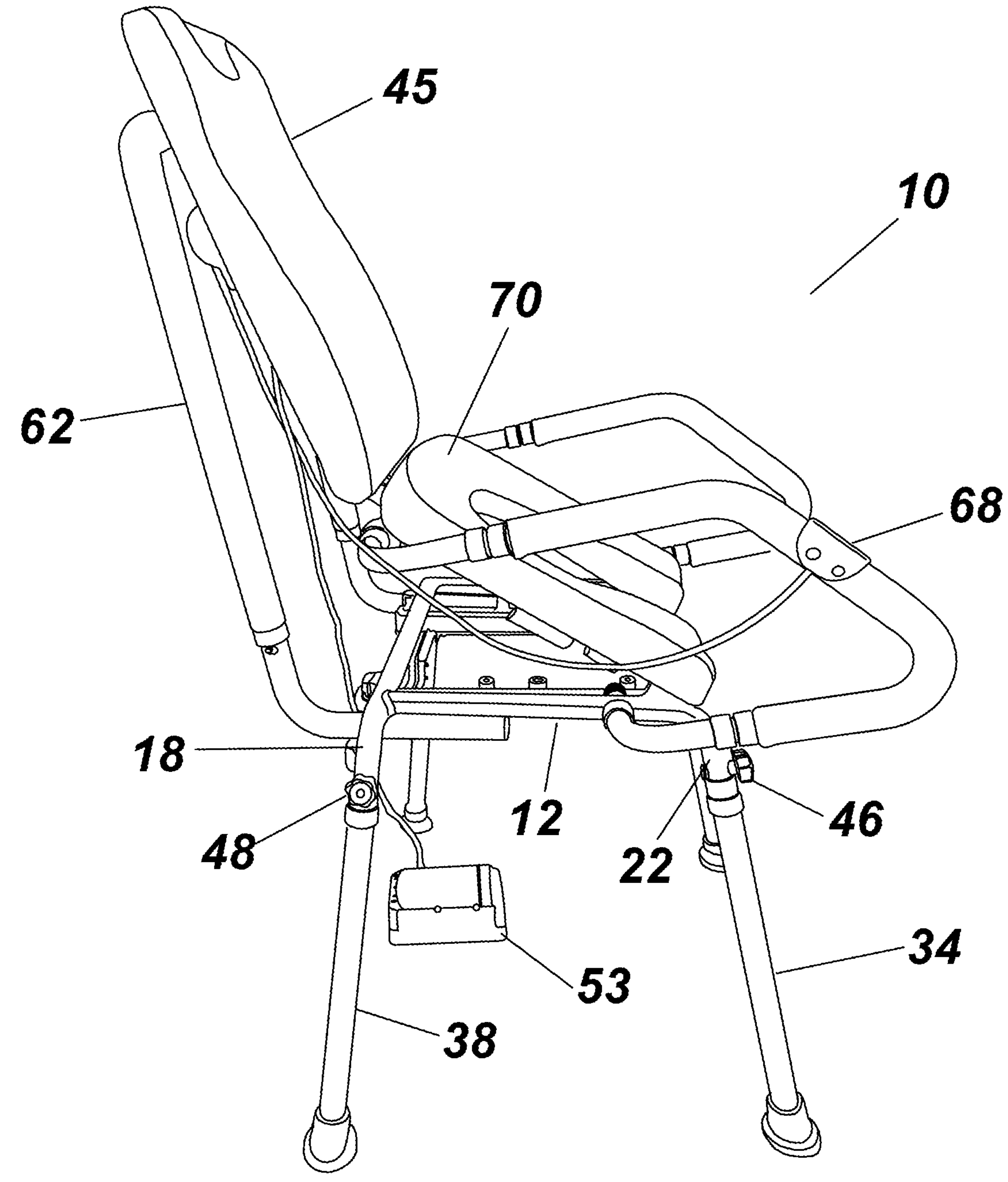
FIG. 6 is a side perspective view with the seat in a raised position.

A vertical piston device 54 having an extendable end 55 located at the rear center of the back assembly 45 and attached thereto by a screw and bolt assembly 56. The vertical piston device 54 is constructed and arranged to rotate the arm member 50 from a first position providing an arm rest portion in a horizontal position shown in FIGS. 1-3, to a second position providing a hand grip portion in a raised position shown in FIGS. 4-6.

The piston device 54 is an electric linear actuator, namely a battery producing 24V DC at 1.2 amp with sufficient capacity to permit numerous linear actuator piston extensions and retractions on a single battery charge. The linear actuator converting the rotary motion of a motor into the linear displacement of a piston along an axis. In the preferred embodiment the battery is recharged by a 100-240 VAC wall socket attached transformer, not shown. In a preferred embodiment a transformer is used to charge the battery 53 having a discharge output of 24V DC. The battery 53 providing further portability allowing operation without being tethered to an AC power source.

The top of the piston device 54 includes a bracket 60 which attaches to the center of the upper frame member 62 of the lift chair 10. The piston device 54 is further anchored to the back cushion 45 to prevent rotation of the piston device while coupled to the bracket 60. The motor 58 which operates the piston device 54 is connected to the battery 53 through use of a conventional power cord 61. The lifting operation of the chair 10 is achieved through use of a cable 66 attached to remote control device 68 preferably attached to the right front of the arm member 50. Alternatively the controller can be wireless.

The lift chair has a cushioned seat 70 attached at the bottom front by hinges 72 and 74 to left and right brace members 76 and 78. The chair seat 70 is attached to the rear of the arm member 50 by use of rotatable circular brackets 82 and 84 for pivoting rotation when the seat is in the lifted position. The chair seat 70 is in a typical U-shaped "toilet seat" configuration, having a void 72 in the center. The cushioned upper back section 45 is conformed in a generally vertical rectangular shape. The lower frame is constructed and arranged for placement over a conventional toilet.

The term "coupled" is defined as connected, although not necessarily directly, and not necessarily mechanically. The use of the term "or" in the claims is used to mean "and/or" unless explicitly indicated to refer to alternatives only or the alternative are mutually exclusive, although the disclosure supports a definition that refers to only alternatives and "and/or."

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An adjustable lift chair comprising:

a frame defined by an upper frame section and a lower frame section;

an arm member having a first and second spaced apart ends, each end pivotally coupled to a side of said frame, said arm member having a centrally disposed bracket;

a seat having a front end rotatably coupled to said frame and a rear end coupled to said bracket;

a lift device having a first end attached to said centrally disposed lift bracket seat and a second end attach to said upper frame member, said lift device is constructed and arranged to lift the rear end of said seat from a lowered horizontal position to a raised angular position;

a controller coupled to said lift device; and a cushioned back assembly secured to said upper frame member.

2. The adjustable lift chair according to claim 1 wherein said lower frame section comprises a front cross member and a rear cross member, each said cross member having a left and right upper leg extension tube, each upper leg extension tube includes a spring loaded internal pin positioned along a distal end of each extension tube, each said upper leg extension tube constructed and arranged to couple with lower leg extension tubes inserted over a portion of the upper leg extension tubes and adjusted to a height by selection of a plurality of holes for engagement by said internal pins.

3. The adjustable lift chair according to claim 1 wherein said seat is U-shaped with a void in the center.

4. The adjustable lift chair according to claim 1 wherein said cushioned back assembly is fastened to said upper frame member.

5. The adjustable lift chair according to claim 1 wherein said lift device is an electric linear actuator.

6. The adjustable lift chair according to claim 1 wherein said linear actuator is powered by a rechargeable battery having a 24V DC output at 1.2 amps and a capacity for numerous piston extension and retraction, said battery recharged by a 120V AC transformer.

7. The adjustable lift chair according to claim 1 wherein said electric linear actuator is fastened to said cushioned back assembly.

8. The adjustable lift chair according to claim 1 wherein said controller is secured to said arm member.

9. The adjustable lift chair according to claim 2 wherein said lower frame is constructed and arranged for placement over a conventional toilet.

* * * * *